UNITED STATES PATENT OFFICE.

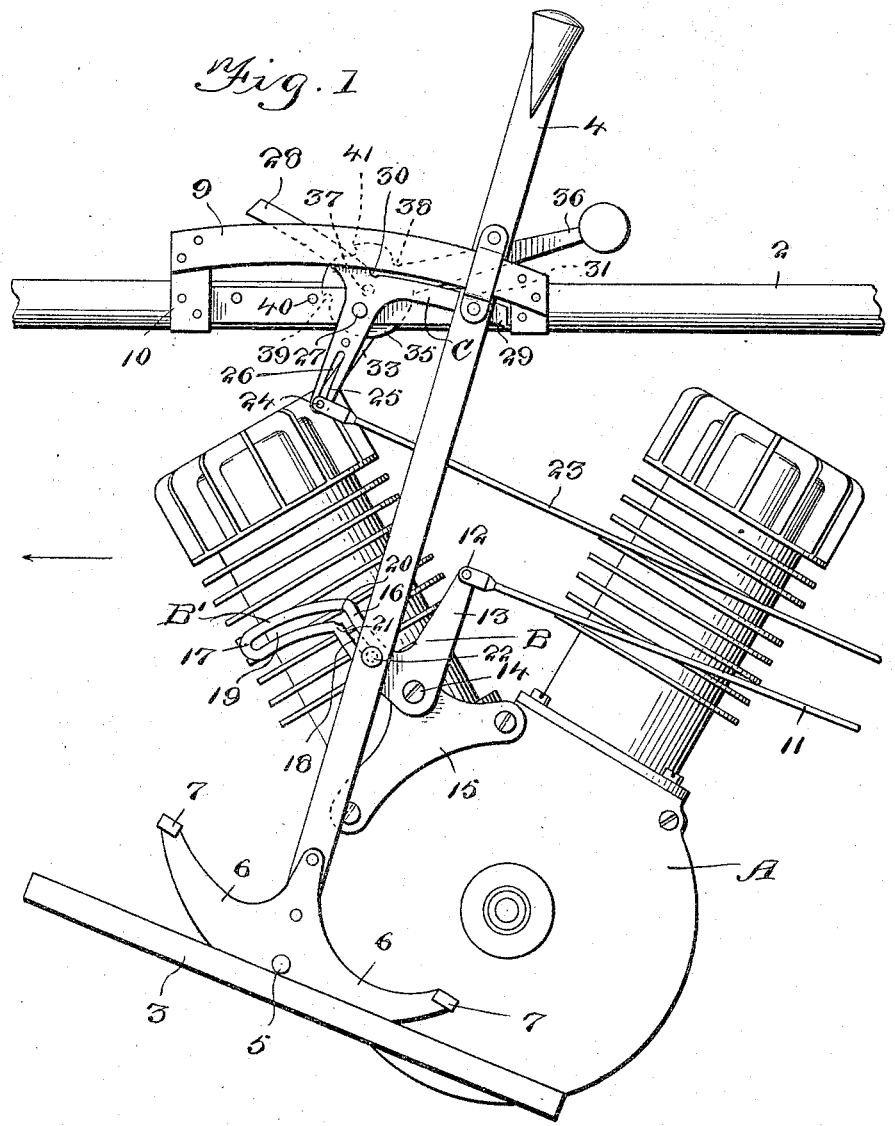

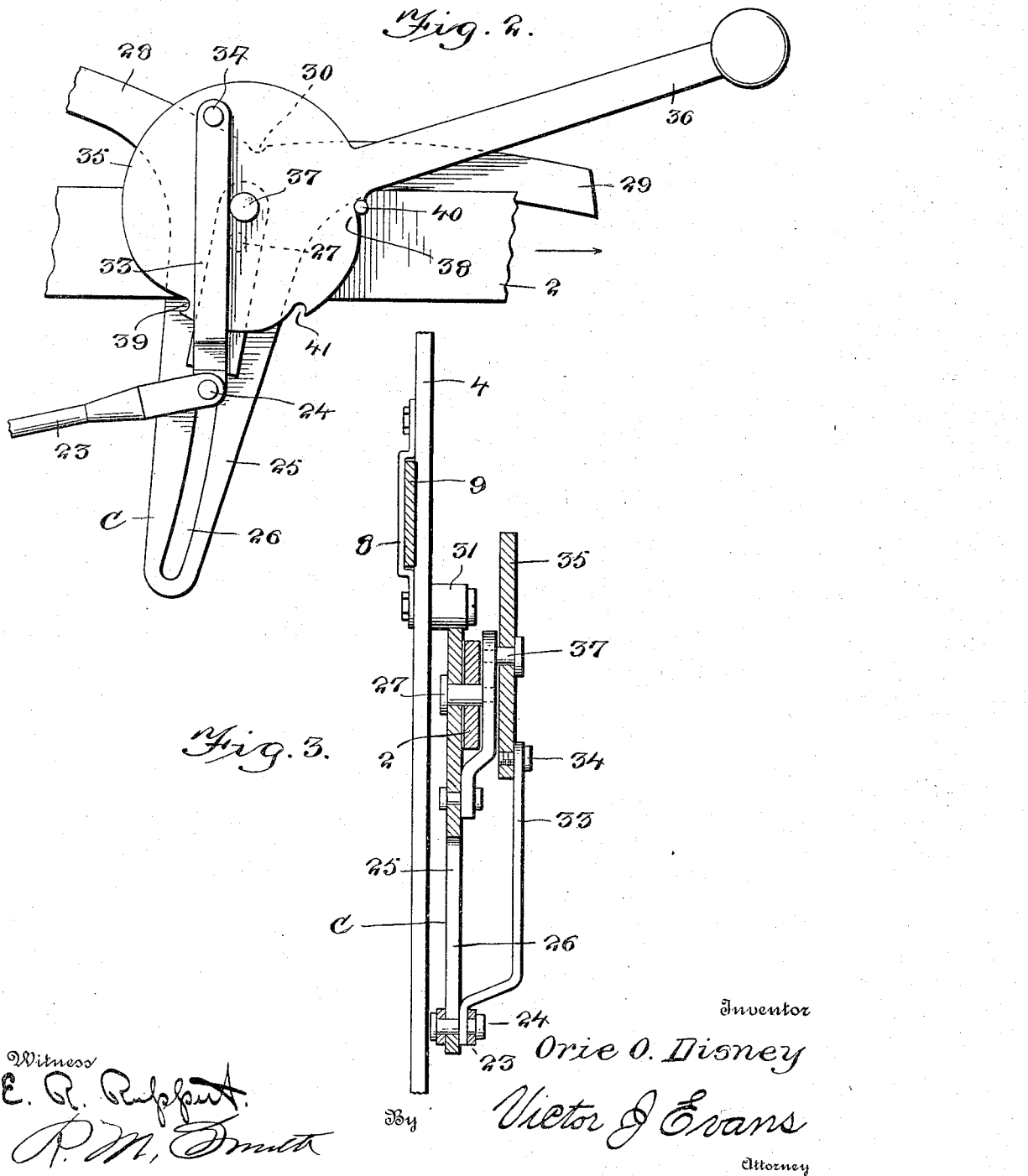

ORIE O. DISNEY, OF RICHLAND, KANSAS.

GEAR AND CLUTCH CONTROL.

1,192,284. Specification of Letters Patent. Patented July 25, 1916.

Application filed November 17, 1915. Serial No. 61,986.

*To all whom it may concern:*

Be it known that I, ORIE O. DISNEY, a citizen of the United States, residing at Richland, in the county of Shawnee and State of Kansas, have invented new and useful Improvements in Gear and Clutch Controls, of which the following is a specification.

This invention relates to gear and clutch controls and is especially designed for use in connection with motorcycles, the object of the invention being to provide means whereby, with the aid of a single manually operated lever, a change may be made from one speed to another and the clutch simultaneously thrown out and in, enabling the driver to shift the gears by hand or foot and in the latter case without removing the hands from the handle bars.

With the above and other objects in view, the invention consists in the novel construction, combination and arrangement of parts, as herein described, illustrated and claimed.

In the accompanying drawings: Figure 1 is a side elevation of a sufficient portion of a motorcycle to illustrate the application and operation of the present invention which is shown applied thereto. Fig. 2 is a view of a portion of the gear shifting mechanism taken opposite to Fig. 1. Fig. 3 is an upright sectional view showing the relation of the several parts of the gear shifting mechanism.

Referring to the drawings A conventionally represents the engine of a motorcycle, 2 one of the upper frame bars thereof and 3 one of the lower frame bars, all parts just referred to being of the ordinary construction and arrangement.

In carrying out the present invention, I employ a single main shifting lever 4 which is fulcrumed at 5 on the machine frame and provided with pedal arms 6 extending to opposite sides thereof and provided with pedals 7 by means of which the lever 4 may be operated by foot pressure and without requiring the use of the operator's hand, thus permitting the operator to retain the full grip of both hands on the handle bars of the machine. The lever 4 is provided with a guiding strap 8 on one side thereof which embraces an arcuate guide 9 secured at 10 to the machine frame.

The clutch operating connection designated at 11 is pivotally connected at 12 to one arm 13 of a bell crank lever designated generally at B, the same being pivotally mounted at 14 on a bracket 15 which is shown as connected to the frame of the engine A. The lever B may, of course, be pivotally mounted on any other part of the machine. Said lever comprises another arm designated generally at B' and embodying two angularly related portions 16 and 17, the portion 16 having an arcuate slot 18 formed therein and the portion 17 having an arcuate slot 19 formed therein, the slots 18 and 19 merging at 20 where the lever arm B is formed with a notch 21 forming a rest or dwell for a projection 22 on the adjacent side of the lever 4, said projection 22 being preferably in the form of a roller as shown which traverses the slots 18 and 19 with a minimum amount of friction. Under the arrangement just described, when the lever 4 is moved in either direction to the full extent of its movement, the lever B is rocked back and forth so as to correspondingly affect the clutch operating connection 11 for the purpose of throwing out the clutch and again throwing in the clutch.

The gear shifting connection designated at 23 is connected by a pivot 24 to the downwardly extending arm 25 of a gear shifting lever designated generally at C, the arm 25 being formed with a longitudinal slot 26 the purpose of which will presently appear. The lever C is mounted on a pivot 27 supported by the frame bar 2 and said lever comprises a pair of divergent arms 28 and 29 disposed at an angle to each other, the lever C being thus substantially Y-shaped and being formed with a notch 30 in the reentrant angle between the arms 28 and 29 for a purpose which will presently appear. The lever 4 is provided with a projection 31 on one side, said projection being preferably in the form of an anti-friction roller which works against the top edges of the arms 28 and 29. As the lever 4 is thrown forward from the high speed position shown in Fig. 1, the projection 31 moves along the upper edge of the arm 29 without imparting any movement to the lever C. Upon reaching the notch 30, however, the projection 31 begins to act on the other arm 28 of the lever C thereby depressing the arm 28 and swinging the arm 25 and imparting a corresponding movement to the gear shifting connection 23. Under the arrangement shown in Fig. 1, when the lever 4 is thrust forward to the limit of its movement, the connection 23 shifts the gears into low speed. In order to shift the gears into second or intermediate speed, the pivot 24 is moved to the upper end of the slot 26. This is accomplished by the means shown in Fig. 2 wherein it will be seen that the pivot 24 has connected thereto a link 33 which is pivotally attached at 34 to the disk-shaped body 35 of a throw-changing lever 36 connected by a pivot 37 to the gear shifting lever C. The disk-shaped body 35 is provided with notches 38, 41 and 39 in the periphery thereof either of which is adapted to engage a stop 40 shown in the form of a pin which acts to lock the throw-changing lever 36 in a predetermined position either with the pivot 24 near one end of the slot 26 or near the other end thereof. It will now be understood that when the lever 36 is swung rearwardly, the link 33 lifts the pivot 24 and carries the same to a point near the upper end of the slot 26 said point being about midway between the outer end of the slot 26 and the pivot 27 of the gear shifting lever C. Therefore, when the arm 25 of the lever C swings through its full movement, the gear shifting connection 23 will receive only approximately one half the movement that it receives when the pivot 24 is at the lower end of the slot 26, the result being that the gears are shifted to second speed instead of low speed.

From the foregoing description, taken in connection with the accompanying drawings, it will now be understood that when the lever 4 is swung to the full limit of its movement in either direction, the clutch shifting lever B is oscillated in such manner as to throw the clutch out and in, the clutch being out when the projection 22 reaches the notch 21 where it may rest for a moment. Just at this time the projection 31 reaches the notch 30 of the gear shifting lever C and thereupon the last named lever is quickly swung throughout the full limit of its movement before the projection 22 has proceeded far enough from the notch 21 to allow the clutch operating connection 11 to again let in the clutch. This avoids any possibility of stripping the gears of the transmission whether the operator is shifting from low to second speed or from second to high speed, the only difference in the relation of the parts being the position of the pivot 24 in relation to the lever C. Pressure on the appropriate pedal 7 will throw the lever 4 either forwardly or backwardly thus enabling the rider to keep both hands on the handle bars. In view of the fact that the throw-changing lever 36 is pivotally mounted on the gear shifting lever C, with the pivot 37 above the pivot 27, when the lever 4 is swung over, the disk-shaped body portion 35 of the throw-changing lever 36 is bodily shifted therewith, bringing the proper notch 38 or 39 into locking engagement with the stop 40.

Having thus described my invention, I claim:—

1. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, and a gear shifting lever acted upon by said main shifting lever in each complete movement of the latter in either direction to actuate the gear shifting connection at a time when the clutch shifting connection is in position to hold the clutch out.

2. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, and a gear shifting lever having arms in angular relation to each other which are acted upon by said main shifting lever in each complete movement of the latter in either direction to actuate the gear shifting connection at a time when the clutch shifting connection is in position to hold the clutch out.

3. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, a gear shifting lever acted upon by said main shifting lever in each complete movement of the latter in either direction to actuate the gear shifting connection at a time when the clutch shifting connection is in position to hold the clutch out, said gear shifting lever having an arm to which the gear shifting connection is attached, and means for adjusting the point of connection between the last named lever arm and connection to vary the throw of the latter.

4. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, a gear shifting lever acted upon by said main shifting lever in each complete movement of the latter in either direction to actuate the gear shifting connection at a time when the clutch shifting connection is in position to hold the clutch out, said gear shifting lever having an arm to which the gear shifting connection is attached, and means for adjusting the point of connection between the last named lever arm and connection to vary the throw of the latter, said throw-adjusting means being mounted on the gear shifting lever.

5. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, a gear shifting lever acted upon by said main shifting lever in each complete movement of the latter in either direction to actuate the gear shifting connection at a time when the clutch shifting connection is in position to hold the clutch out, said gear shifting lever having an arm to which the gear shifting connection is attached, means for adjusting the point of connection between the last named lever arm and connection to vary the throw of the latter, said throw-adjusting means being mounted on the gear shifting lever and embodying a throw-changing lever pivoted out of line with the gear shifting lever, and a link connecting the throw-changing lever with the gear shifting connection.

6. A one lever transmission and clutch control, embodying, in combination with a gear shifting connection, and a clutch shifting connection, a manually operable main shifting lever, a clutch shifting lever acted upon by said main shifting lever and operating on the clutch shifting connection to throw the clutch out and in again in each complete forward movement of the main shifting lever and again in each complete backward movement thereof, a gear shifting lever acted upon by said main shifting lever in each complete movement of the latter in either direction to actuate the gear shifting connection at a time when the clutch shifting connection is in position to hold the clutch out, said gear shifting lever having an arm to which the gear shifting connection is attached, means for adjusting the point of connection between the last named lever arm and connection to vary the throw of the latter, said throw-adjusting means being mounted on the gear shifting lever and embodying a throw-changing lever pivoted out of line with the gear shifting lever, a link connecting the throw-changing lever with the gear shifting connection, and locking means for the last named lever.

In testimony whereof I affix my signature in presence of two witnesses.

ORIE O. DISNEY.

Witnesses:
 WM. T. GRAY,
 C. E. TERRELL.

Copies of this patent may be obtained for five cents each, by addressing the "Commissioner of Patents, Washington, D. C."